United States Patent [19]
Gillot et al.

[11] 3,902,861
[45] Sept. 2, 1975

[54] COMPOSITE MATERIAL

[75] Inventors: Jacques Gillot, Grand-Lancy; Marcel Nussbaum, Thonex; Stuart Exelle, Geneva; Benno Lux, Veyrier, all of Switzerland

[73] Assignee: Bottelle Memorial Institute, Carouge, Switzerland

[22] Filed: Aug. 14, 1973

[21] Appl. No.: 388,224

Related U.S. Application Data

[63] Continuation-in-part of Ser. No. 60,109, July 31, 1970, abandoned.

[30] Foreign Application Priority Data

July 31, 1969 Switzerland.................. 11632/69

[52] U.S. Cl................................ 29/180 R; 29/183
[51] Int. Cl.²..................................... B22D 19/00
[58] Field of Search... 29/183, 183.5, 195 C, 180 R; 423/445, 447; 164/97; 75/20 F, 20 R

[56] References Cited
UNITED STATES PATENTS

| | | |
|---|---|---|
| 1,828,009 | 10/1931 | Westhafer................ 423/445 UX |
| 3,098,723 | 7/1963 | Milks........................... 29/195 C |
| 3,224,846 | 12/1965 | Fiedler et al................ 29/183.5 |
| 3,239,319 | 3/1966 | Pollard............................ 164/97 X |
| 3,342,555 | 9/1967 | McMillan......................... 423/449 |
| 3,345,440 | 10/1967 | Googin et al..................... 264/29 |
| 3,384,463 | 5/1968 | Olstowski et al.............. 29/183 X |
| 3,387,940 | 6/1968 | McHenry et al................. 423/449 |
| 3,427,120 | 2/1969 | Shindo et al................. 423/447 X |
| 3,608,170 | 9/1971 | Larson et al.................. 164/97 X |
| 3,619,430 | 11/1971 | Hiratsuka et al............. 29/195 C X |

*Primary Examiner*—L. Dewayne Rutledge
*Assistant Examiner*—O. F. Crutchfield
*Attorney, Agent, or Firm*—Waters, Schwartz & Nissen

[57] ABSTRACT

Composite material comprising a major portion by volume – preferably between 55 and 80 volume percent – of spherical cellular carbon bodies homogeneously embedded in a metal matrix, e.g., aluminum, copper and cast iron.

6 Claims, No Drawings

COMPOSITE MATERIAL

This application is a continuation-in-part of Ser. No. 60,109, filed July 31, 1970, now abandoned.

This invention relates to a composite material of the kind comprising a compact substance in which are embedded light small-sized bodies having a density markedly less than that of the compact substance and occupying the major part of the volume of the material.

Composite materials of this kind obviously have a lesser density than that of the compact substance used for their manufacture. This can for instance be of advantage in certain applications of cast components, in particular cast components made of light metal.

The compact substance can have a wide variety of forms, e.g., a metal or metal alloy, a synthetic or natural resin, glass and cement. However, a metal or metal alloy appears to be the form of substance of greater interest and only this particular form will be described here.

So far, mineral salt granules, glass beads and the like have been used by way of light bodies. These bodies either are fusible at low temperature or react chemically with some metals, thereby limiting the scope of their use, and an object of the invention is to overcome this drawback.

A composite material comprising vermicular expanded graphite dispersed throughout a matrix of a metal body, said composite containing essentially closed cell voids, has been disclosed in U.S. Pat. No. 3,384,463. Such a composite has a density of about 40 to 70 percent of that of the pure metal used for its manufacture, and is compressible and abradable. However the fatigue resistance of such a composite when submitted to cyclic stress, is low. For instance a standard R. R. Moore type rotating beam fatigue speciment (as described in "Manual on Fatigue Testing" publ. by American Society for Testing and Materials 1949 and textbook "The Making, Shaping and Treating of Steel" United States Steel 1964 p. 1174) prepared according to example III of said U.S. Pat. and made of vermicular expanded graphite and aluminum and having a density of about 1.31 g/cm$^3$, failed after 100,000 cycles of a stress of 1.4 kg/mm$^2$.

According to the present invention, there is provided a composite material of the kind set forth, wherein the said bodies are spherical carbon bodies having a cellular structure and are homogeneously embedded in a metal matrix.

Preferably, the diameter of these spherical carbon bodies ranges from 0.1 to 50 mm.

Also preferably, these spherical, cellular carbon bodies are made of a carbonized, cellular, organic substance, such as light porous wood, for instance balsa, synthetic resin foams and natural or synthetic cellular plastics, the carbonization having been effected, for instance, by heating such cellular organic substance, in a manner already known as such, in a non-oxidizing atmosphere, for example an inert or reducing atmosphere, at a temperature between 100° and 1,200°C for a length of time between 1 and 24 hours.

Most preferably, said carbonized cellular organic substance is a carbonized thermosetting resin foam and particularly a carbonized thermosetting resin foam having a closed cell structure, with a ratio between the mean diameter of the cells and the mean diameter of the spherical carbon bodies between 0.001 and 0.25.

Preferably, the spherical carbon bodies are surrounded by a carbon skin substantially impervious to liquid molten metal.

Thermosetting resins are used as preferred starting products for the manufacture of the spherical carbon bodies owing to the fact that these resins can be carbonized, in a non-oxidizing atmosphere, without softening, i.e., without changing their initial shape. This property is important because there can then be prepared synthetic resin bodies having the shape that is required for the light carbon bodies, e.g., spherical pellets.

The thermosetting resin used can for instance be phenolic resins or polymeric resins of furfuryl alcohol.

The choice of the particular thermosetting resin to be used is guided by the search for substances that provide, upon being carbonized, a carbonaceous residue corresponding to a major part of the initial mass.

Use can also be made of bodies made of a thermoplastic resin, e.g., small pellets of porous expanded polystyrene, which are provided with a coating of thermosetting polymer having a thickness sufficient that, upon carbonization, a hollow carbon body, e.g., a hollow pellet, may be formed.

In general, use can be made of any organic substance which has a low density compared to that of a metal and which produces, upon being carbonized, a carbon body of low density also. The cited materials satisfy this condition since they have the following densities before and after carbonization:

| Material | Density before carbonization | Density after carbonization |
|---|---|---|
| Balsa | 0.090 | 0.068 |
| Phenolic foam | 0.040 | 0.043 |

Phenolic resin foams and furfuryl alcohol resin foams retain about half their mass after carbonization.

Small spherical pellets of carbon foam can be produced as follows: a thermosetting organic resin, mixed with a blowing agent and a hardening agent, e.g., a resol resin, i.e., a phenolformaldehyde resin in its first stage of condensation mixed with petroleum ether, as a blowing agent, and with a mixture of sulfuric acid and of phosphoric acid, in aqueous solution, as a hardening agent, is poured onto a substrate having hemispherical cavities of a diameter equal to that required for the pellets. The resin is then scraped off the top of the substrate and the remaining resin in each of the cavities is heated so as first to swell up into an approximately spherical shape and then to harden. There are thus produced small, cellular pellets of hardened resin having a foamed structure with closed cells. These pellets are then subjected to a carbonization treatment in a non-oxidizing atmosphere, e.g., by heating them progressively to a temperature of 600° to 900°C over a period of 10 hours or so in an atmosphere of argon and then by heating them in vacuo for 1 hour at a temperature of 1,200° to 1,300°C.

Preferably, the maximum carbonization temperature is greater than that at which the metal is cast during manufacture of the composite material. During carbonization, both the weight and volume of a hardened cellular phenolic resin of the resol type are reduced by about half.

The metals which can be used for the composite material according to the invention are all those which do not react with carbon at their melting temperature and do not dissolve it or at any rate metals which, if they do react with carbon and dissolve it, do so only slowly. Examples of metals which do not react with carbon are the following: Cu, Zn, Ag, Cd, In, Sn, Sb, Au, Pb and Bi. Examples of metals that dissolve carbon, or react therewith, only slowly are the following: Si, Ti, Zr, Hg, V, Nb, Ta, Cr, Mo, W, Al and Fe.

According to a preferred embodiment of the invention, light metals, particularly aluminum, are used in order to permit a composite material having a low density to be obtained.

The ratio of the volume of the spherical carbon bodies to the total volume of the composite material may be varied to suit the desired properties of the composite material, for instance its density.

Preferably, the composite material comprises at least 55 and at most 80 volume percent carbon bodies.

The above-stated inferior limit corresponds to a volume ratio which permits a substantial reduction of the density of the composite material compared to the density of its metallic component alone, and the superior limit is imposed by bead packing considerations.

For instance, a composite material containing 80 volume percent spherical cellular carbon pellets and 20 volume percent aluminum has a density of 0.54 g/cm$^3$, whereas a composite material made of 55 volume percent spherical cellular carbon pellets and 45 volume percent aluminum has a density of 1.16 g/cm$^3$, the density of pure aluminum being 2.7 g/cm$^3$.

As regards the distribution by volume of the constituents of the material, i.e., between the carbon bodies and the metal, three forms of embodiments are to be considered. According to the first, the metal occupies all of the free space between the carbon bodies. According to the second, the metal occupies only part of this space, thus leading to the production of a material having a particularly low density since a major proportion of its volume is made up of free spaces. The latter may communicate with one another or be cut off from one another depending on the amount of metal and on the configuration of the cellular carbon bodies. Finally, the third form of embodiment corresponds to a material in which the cellular carbon bodies have been at least partly eliminated without modifying the general structure of the material, e.g., by combustion, in an oxidizing atmosphere, of these bodies within a material corresponding to either of the first two forms of embodiments.

As regards the method of making the composite material according to the invention, it comprises casting the molten metal into a mold containing the spherical cellular carbon bodies, allowing the mold and its contents to cool, and extracting the cooled contents from the mold.

The casting operation can be done in air at atmospheric pressure or at a pressure greater than atmospheric. The casting operation can also be done in the presence of an inert gas, e.g., argon, at atmospheric pressure or at a reduced pressure. By casting in an inert gas atmosphere or in a vaccum possible oxidation of the metal during casting can be avoided. The mold and/or the spherical carbon bodies can be preheated before the casting operation. The carbon bodies can be placed in a cylindrical mold having a piston, e.g., of graphite, and a force can be exerted on the piston whereby pressure may be applied to the metal while it is cast and at the same time creating a vacuum inside the mold. The wetting of the carbon bodies by the metal being cast can be improved by adding a suitable substance to the metal or by providing the cellular carbon bodies with a suitable coating consisting either of the same metal as that to be cast, or of a metal able to be wetted by the metal to be cast, or of a carbide of these metals. When the coating is metallic, it is applied in a known manner such as by painting with a brush or with a spray gun the surfaces of the cellular bodies with a suspension of the metal in an appropriate organic liquid and by then heating the cellular carbon bodies to cause the liquid to evaporate. The cellular carbon bodies can also be dipped into such a metallic paint. When the coating is to be formed by a carbide, it is produced by heating a coating of corresponding metal. The wetting of the cellular carbon bodies by the metal can, if required, be decreased either by adding to the the metal a sufficient quantity — generally of the order of a few percent by weight — of another appropriate metal or by forming a layer of oxide on the surface of the metal. For instance, in the case of aluminum, it suffices to let traces of oxygen (5 parts per million are enough) into the atmosphere of the furnace in which the casting operation takes place — which atmosphere preferably consists of an inert gas such as argon — to bring about the formation on the surface of the aluminum of a very fine layer of oxide which decreases the wetting of the carbon by the aluminum by coming between this metal and the carbon bodies.

As regards the addition of a substance for improving the wetting of the carbon by the metal, the actual substance used will depend on the nature of the metal. In the case of aluminum, additions of titanium and of iron or related metals can be used, e.g., to the extent of 0.1 to 1 percent by weight. In general, the additive may be at least one metal capable of forming a carbide or of dissolving carbon under the conditions in which the material is manufactured. For instance, one of the following metals or a mixture of at least two of these metals can be used, i.e., silicon, titanium, zirconium, hafnium, vanadium, niobium, tantalum, chromium, molybdenum and tungsten. These metals can of course themselves form the main metallic constituent of the material.

A deoxidizing slag can be used over the top surface of the molten metal, during casting, in order to remove from the metal any oxide layer that may have formed beforehand.

As regards the metals that enable the wetting action to be decreased, at least one of the following metals can for instance be used: copper, zinc, silver, cadmium, indium, tin, antimony, gold, lead and bismuth. Of course, as with the metals mentioned earlier that have a strong tendency to wet carbon, the metals that have just been listed and which do not have a strong tendency to wet carbon can also be used as the main metal constituent of the material.

The wetting properties of alloys composed of two or more metals belonging to the two classes that have just been set forth vary from case to case. For instance, whereas pure copper does not wet carbon, an alloy composed of 98 percent by weight of copper and 2 percent by weight of titanium does wet carbon.

The properties of various metals and alloys for wetting carbon, in the graphitic state, have for example been described in the following articles: Yu. V. Naidich and G. A. Kolesnichenko, Poroshkovaya Metallurgiya No. 1 (13), pp. 49 to 53, January– February 1963, and ibid. No. 7 (67), pp. 71 to 75, July 1968.

In the case of iron, it has been found that pure iron does wet carbon whereas carbon saturated iron does not.

When it is desired to manufacture the composite material provided by the invention according to the first form of embodiment indicated earlier, the metal is made to occupy during casting the entire space lying between the carbon bodies and the metals is then caused to solidify by cooling. When it is desired to produce the material provided by the invention according to the second form of embodiment, two operations are performed: during the first, the metal is cast into the mold containing the carbon bodies and during the second, part of the metal is removed in known manner while it is still in a molten state, as by filtration or centrifuging, so that the only metal which is left in contact with the carbon bodies is that which adheres thereto by capillarity, whereupon the metal coated carbon bodies are left to cool. It will of course be appreciated that a material corresponding to this second form of embodiment which requires the cellular carbon bodies to be wetted to some extent by the metal can only be produced if the metal does wet the carbon or if there is added to the metal, when the latter does not wet the metal sufficiently, a sufficient quantity of at least one of the above-mentioned carbon-wetting metals.

The material according to the first form of embodiment can be used as a mechanical energy absorbing material — e.g. as armour plating — , as a material for making motor vehicle bumpers, or as a sound wave absorbing material — e.g. as a material for making sound insulating panels.

The material according to the second or to the third form of embodiment can be used in cases where it is of advantage to have a highly porous state in association with the metallic properties — e.g. as a material for making heat exchangers.

The following examples will further illustrate the invention:

EXAMPLE 1

Small, cellular carbon foam bodies of approximately spherical shape having a diameter of 5 mm are produced as follows:

A mixture of the following ingredients:

a. 50 grams of a resol resin having a density of 1.245 to 1.255 and a viscosity of 35 to 50 poises at 25°C, known in the trade under the name of "Bakelite 57.12" (Bakelite being a Registered Trade Mark), b. 4 ml of petroleum ether having a distillation curve between 35° and 70°C, and c. 6 ml of a hardening mixture having the following composition by weight: 14 percent of $H_2SO_4$ at 94 percent, 44 percent of $H_3PO_4$ at 85 percent and 42 percent of distilled $H_2O$, is poured, after being vigorously stirred for 20 to 30 seconds, onto a plate of polytetrafluoroethylene formed with hemispherical cavities having a diameter of 5 mm, so as fill about half the volume of the cavities.

The mixture that is contained in the cavities is then heated for about 15 minutes at a temperature 70°C and then for another 15 minutes at a temperature of 100°C. This results in the production of bodies of approximately spherical shape, made of hardened phenolformaldehyde resin which have a mean diameter of about 7.6 mm, a cellular structure similar to that of foam and a specific weight of the order of 100 g/cm³. These pellets are then carbonized by subjecting them to a two-step process consisting (a) in progressively heating the pellets to a temperature of 600° to 900°C without argon over a period of 15 hours, and (b) in degasing the pellets by maintaining them at a temperature of 1,200° to 1,300°C in a vacuum ($10^{-3}$ torr) for 1 hour.

Spherical pellets of cellular carbon are thus obtained having the following characteristics:

| | |
|---|---|
| mean diameter | 6 mm |
| mean specific weight | 100 g/dm³ |
| means diameter of the cells | 0.1 to 0.2 mm |
| resistance to crushing (i.e. the weight needed to cause crushing of the pellets when held between two parallel steel plates) | 2 kg |

These cellular carbon pellets are tipped into a cylindrical crucible made of graphite and having an internal diameter of 100 mm, until it is about 60 percent full whereupon some fine-meshed stanless-steel wire netting is placed over the layer of carbon pellets thereby to prevent them from rising to the surface of the metal bath when the latter is being cast.

Small lumps of 99.99 percent pure aluminum are then placed on the netting, within the crucible, and the latter is then placed, in an atmosphere of argon, at atmospheric pressure, at the middle of an upright induction furnace coil. The crucible is then heated to a temperature of 700°C so as to cause the aluminum to melt completely whereupon the contents of the crucible are progressively cooled, starting from the bottom. To this end, the crucible is slowly lowered through the coil to cause it to issue at the bottom thereof.

A block is thus produced of which about 60 percent of its volume is made up of carbon pellets, with the remaining 40 percent being made up of aluminum. The density of this block is 1.14 whereas that of aluminum is 2.7.

This block is highly compressible but its resistance to compression increases progressively with deformation, as shown by the following table:

| Extent of the deformation (volumetric contraction in %) | Resistance to compression (kg/cm²) |
|---|---|
| 0 | 0 |
| 1 | 50 |
| 2 | 80 |
| 3 | 130 |
| 5 | 160 |
| 10 | 180 |
| 20 | 190 |
| 30 | 220 |
| 35 | 220 |

This material can be used whenever such compressibility characteristics are of advantage, for instance in the production of motor vehicle bumpers or as a sound wave absorbing material.

A standard R. R. Moore type rotating beam fatigue specimen of the composite material, prepared according to this example, withstands, without failure, 10 million cycles of a stress of 1.4 kg/mm², which is 100 times as much as the number of bending stress cycles withstood by the composite material made of vermicular expanded graphite and aluminum disclosed in U.S. Pat. No. 3,384,463.

EXAMPLE 2

The procedure is the same as in Example 1, using the same cellular carbon pellets but using copper as the metal, the casting being done by heating small lumps of copper, placed on the steel wire netting inside the crucible, to a temperature of 1150°C.

A block is thus obtained of which 60 percent of its volume is made up of carbon pellets and the remainder is copper. The density of this material is 3.62 whereas that of copper is 8.9.

EXAMPLE 3

The procedure is the same as in the previous two examples but the cast metal is here made up of carbon saturated iron.

In the resulting block the carbon pellets and the cast iron respectively form 55 and 45 percent of its volume. The density of this material is 3.2 whereas that of the cast iron is 7.

EXAMPLE 4

Spherical cellular carbon beads having a diameter between about 1.5 and 4.0 mm as prepared in a manner similar to that which is described in Example 1 but the final step of the carbonization process is effected at a temperature of 1,700°C.

These carbon beads are introduced in a sand mold which is lined inside with a thin steel sheet, and are lightly packed in the mold by vibrating for 2 minutes. The mold is shaped to allow casting of a parallelepiped block of 80 × 80 × 140 mm and is equipped with a side feeder associated with a steel grid to prevent the carbon beads from falling into this feeder.

An iron alloy having the following composition in weight percent: C: 4.8; S: 0,1; Bi: 0.02; P: 0.06; Fe: the rest, is poured into the mold at a temperature of 1,400°C after the mold has been heated to about the same temperature; afterwards the composite material obtained is allowed to solidify by cooling.

One obtains a block of composite material made of spherical cellular carbon beads embedded in a white metallic matrix consisting of cast iron which contains all the carbon as iron carbide $Fe_3C$. The overall density of this composite material is 36 percent that of pure cast iron of the same composition.

This block is then heated in air at 500°C for 3 hours which results in the elimination by burning of the totality of the carbon beads. A cellular metal body, having intercommunicating cells of spherical shape, said cells being homogeneously distributed in the body and forming an open cell porosity communicating with the atmosphere at the exterior of the body is obtained.

This cellular body is finally heated in a bed of roll scale (consisting of a partially sintered powder made of particles having an approximate content of 85 percent by weight FeO, the remainder being a mixture of higher iron oxides and silicates) at 910°C for 30 hours. The cellular metal body remains unchanged as regards its form and dimensions and its porosity. However, the metal has been nearly completely decarburized, i.e. transformed in a recrystallized ferritic structure having an homogeneous composition.

The hardness of the cellular metallic material thus obtained is about 96 – 97 HV (HV being the symbol used for grade of hardness on the Vickers scale measured according to the well known method).

EXAMPLE 5

The procedure is the same as in Example 4, but the proportion of metal part to the total volume of the body is 41 percent.

The compression properties of the material obtained according to Examples 4 and 5 are indicated in the following table:

| Example No. | Proportion of metal (Vol.%) | Compressive strength after 40% compressive deformation (kg/mm²) | Compressive deformation at 7 kg/mm² compression strength (Vol.%) |
|---|---|---|---|
| 4 | 36 | 7 | 40 |
| 5 | 41 | 10 | 22 |

A particular and most interesting form of the material provided by the invention is that in which the metal is cast iron. In this case, by subjecting the material after the metal casting operation to a special tempering treatment which enables the carbon in the solid state to diffuse and hence for at least part of it to deposit on the cellular carbon bodies, there can be produced a material in which the metal constituent is a malleable cast iron whose mechanical properties are similar to those of steel and therefore of particular interest. The tempering treatment used here and the properties of malleable cast iron are described in detail in available literature, in particular in the following publications: "Giesserei Lexikon," pp. 844 to 863, 3rd edition (1962) (Fachverlag Schiele & Schön, Berlin), and "Microtechnic," Volume XIII, No. 2, pp. 88 to 98.

We claim:
1. A composite material comprising a major portion by volume of spherical cellular carbon bodies consisting of a carbonized thermosetting resin foam homogeneously embedded in a metal matrix.
2. A composite material as claimed in claim 1, wherein the diameter of the spherical cellular carbon bodies is from 0.1 to 50 mm.
3. A composite material as claimed in claim 1, wherein the metal is a light metal.
4. A composite material as claimed in claim 3, wherein said light metal is aluminum.
5. A composite material as claimed in claim 1, wherein the metal is copper.
6. A composite material as claimed in claim 1, wherein the metal is cast iron.

* * * * *